L. WILLIS & O. F. WOODWORTH.
LEVER FOR AGRICULTURAL IMPLEMENTS.
APPLICATION FILED MAR. 15, 1918.
1,290,454.
Patented Jan. 7, 1919.
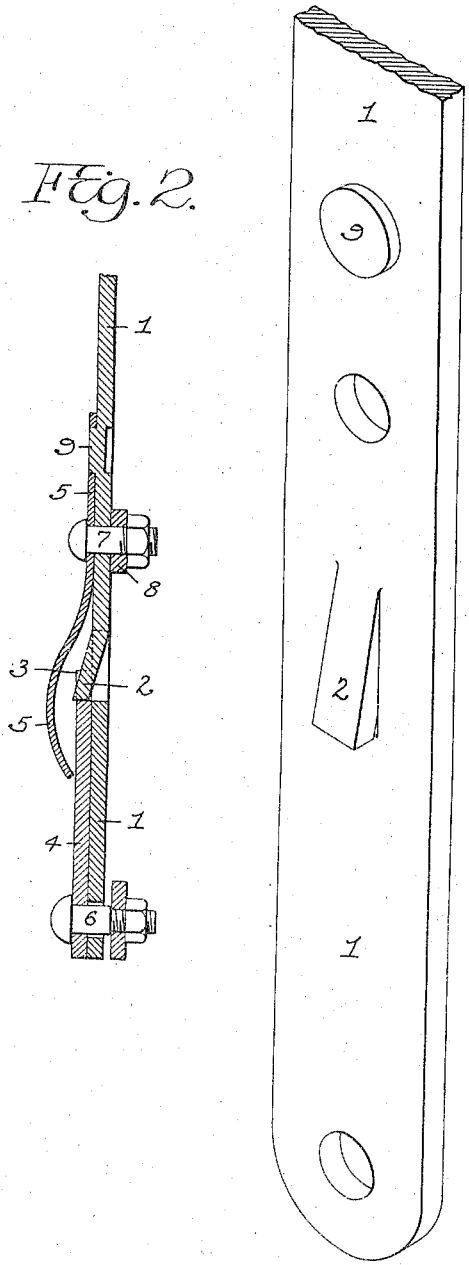
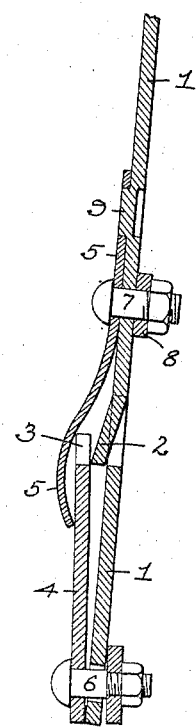
INVENTORS
LELAND WILLIS
OLIN F. WOODWORTH
BY THEIR ATTORNEY
Harry Smith

UNITED STATES PATENT OFFICE.

LELAND WILLIS AND OLIN F. WOODWORTH, OF GRENLOCH, NEW JERSEY, ASSIGNORS TO BATEMAN MANUFACTURING COMPANY, OF GRENLOCH, NEW JERSEY, A CORPORATION OF NEW JERSEY.

LEVER FOR AGRICULTURAL IMPLEMENTS.

1,290,454.  Specification of Letters Patent.  Patented Jan. 7, 1919.

Original application filed November 19, 1917, Serial No. 202,743. Divided and this application filed March 15, 1918. Serial No. 222,529.

*To all whom it may concern:*

Be it known that we, LELAND WILLIS and OLIN F. WOODWORTH, citizens of the United States, residing in Grenloch, New Jersey, have invented certain Improvements in Levers for Agricultural Implements, the same being a division of our application Serial No. 202,743, filed November 19, 1917, of which the following is a specification.

Our invention relates to agricultural implements of that class which have parts adjusted by means of a lever held in its different positions of adjustment by means of a rack, the object of our invention being to so construct such a lever as to lessen its cost without detracting from its serviceability.

In the accompanying drawing

Figure 1 is a perspective view of the lower portion of an adjusting lever made in accordance with our invention;

Fig. 2 is a sectional view of the same and of the notched rack with which it coöperates, the lever being shown in engagement with said rack, and Fig. 3 is a view similar to Fig. 2 but showing the lever moved into position to free it from engagement with the rack.

Heretofore in machines of the type to which our invention relates the lever has been provided with a tooth guided so as to be free to slide longitudinally thereon and moved in one direction so as to engage with the teeth of the rack by means of a spring and in the other direction so as to be free from such engagement by means of a pivoted hand lever at the outer end of the lever. Such construction, however, is expensive, and it is the object of our invention to provide a cheap and acceptable substitute therefor.

Our improved lever is shown at 1 and consists of a metal bar of proper width and thickness, said bar having struck up laterally therefrom a tooth 2 for engagement with the teeth 3 of the rack 4 when said lever is in the position shown in Fig. 2, that is to say, when it is in position parallel with said rack, the lever being normally retained in this position by means of a plate spring 5 which is mounted upon the same side of the lever as the projecting tooth and whose free end bears against the outer face of the rack, as shown in Fig. 2, so as to retain the tooth 2 in engagement with a tooth of the rack.

The bolt 6 whereby the lever is pivoted to the lower portion of the rack fits so loosely in the opening provided for its reception in the lever that lateral displacement of the latter to an extent sufficient to withdraw the tooth 2 of the lever laterally from engagement with the tooth of the rack is permitted, as shown in Fig. 3, said lateral movement, however, imparting such tension to the spring 4 that as soon as lateral pressure is removed from the lever the latter will again assume the position shown in Fig. 2, and draw the tooth 2 into engagement with a tooth of the rack.

The bolt 7 which serves to secure the spring plate 5 in place against the lever also serves as a pivot bolt for the connecting rod 8 whereby the movement of the lever is transmitted to the part intended to be moved thereby.

The bar 1 has, above the tooth 2, a projecting boss 9 likewise struck up therefrom and serving to engage an opening in the upper end of the spring plate 5 so as to prevent any turning movement of the latter on the bolt 7 and thereby insure the rigid retention of said spring plate in position on the lever.

We claim:

1. The within described adjusting lever for agricultural implements, the same consisting of a bar having a tooth formed by a finger constituting an integral part of the bar but at its lower free end bent outwardly from the face of the bar whereby it presents a tooth with opposite edges at right angles to its face for engagement with the abrupt faces of vertically projecting teeth formed on the upper edge of an upwardly projecting retaining rack.

2. The within described adjusting lever for agricultural implements, the same consisting of a bar having a tooth projecting from one side of the same and formed by bending outwardly the free end of a finger constituting an integral portion of the bar, said bar also having, above said finger, a boss struck up from the same side of the bar as the finger, and a spring secured to the bar and having an opening for receiving said boss.

3. The within described adjusting lever for agricultural implements, said lever having, on one side of the same, a spring member, a tooth projecting laterally from said side of the bar and formed by bending outwardly the free end of a finger constituting an integral portion of the bar, a boss struck up from said bar above said finger and engaging an opening in the upper end of the spring, and an opening between the boss and tooth for the reception of a spring-securing bolt.

In testimony whereof, we have signed our names to this specification.

LELAND WILLIS.
OLIN F. WOODWORTH.

Copies of this patent may be obtained for five cents each, by addressing the "Commissioner of Patents, Washington, D. C."